United States Patent
Nguyen et al.

(10) Patent No.: US 7,293,166 B2
(45) Date of Patent: Nov. 6, 2007

(54) METHOD OF INDICATING A FORMAT OF ACCESSING AN OPERATING SYSTEM CONTAINED ON A USB MEMORY DEVICE

(75) Inventors: Tri M. Nguyen, Cypress, TX (US); Christoph J. Graham, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 435 days.

(21) Appl. No.: 10/794,213

(22) Filed: Mar. 5, 2004

(65) Prior Publication Data

US 2005/0198485 A1    Sep. 8, 2005

(51) Int. Cl.
*G06F 9/00*    (2006.01)
(52) U.S. Cl. .................... 713/1; 713/2; 713/100
(58) Field of Classification Search ............... 713/1, 713/2, 100
See application file for complete search history.

(56) References Cited

U.S. PATENT DOCUMENTS

| | | | |
|---|---|---|---|
| 5,854,905 A | 12/1998 | Garney | |
| 6,553,432 B1 | 4/2003 | Critz et al. | |
| 6,751,692 B1* | 6/2004 | Nakamura et al. | 710/100 |
| 7,073,013 B2* | 7/2006 | Lasser | 711/102 |
| 2003/0005278 A1 | 1/2003 | Deng et al. | |
| 2003/0145141 A1* | 7/2003 | Chen et al. | 710/74 |
| 2003/0200379 A1 | 10/2003 | Hollingsworth et al. | |
| 2004/0059907 A1* | 3/2004 | Cochran et al. | 713/2 |
| 2004/0184174 A1* | 9/2004 | Woo | 360/39 |
| 2004/0243749 A1* | 12/2004 | Learmonth | 710/73 |
| 2005/0010717 A1* | 1/2005 | Ng et al. | 711/103 |
| 2006/0190941 A1* | 8/2006 | Kobayashi et al. | 717/174 |

OTHER PUBLICATIONS

Clausen, Andrew; Kreuter, Richard; The GNU Parted Manual, version 1.6.1; May 13, 2002; GNU Parted table of contents (p. 1 of 2), and 2.4.16 set (p. 2 of 2).*

* cited by examiner

*Primary Examiner*—Thomas Lee
*Assistant Examiner*—Malcolm D Cribbs (57) ABSTRACT

One embodiment of a bootable Universal Serial Bus (USB) memory device system provides a system and method for booting a processor using a bootable solid-state memory device. Briefly described, the embodiment comprises a USB connector configured to couple to a USB port of a processing system, a solid-state memory coupled to the USB connector, a boot record residing on the solid-state memory, and an operating system residing on the solid-state memory, wherein the boot record is configured to cause the processing system when executing a Basic Input/Output System (BIOS) program during a boot process to access the operating system using a logical block address (LBA) format.

33 Claims, 3 Drawing Sheets

METHOD OF INDICATING A FORMAT OF ACCESSING AN OPERATING SYSTEM CONTAINED ON A USB MEMORY DEVICE

BACKGROUND

Processing systems, such as personal computers, laptops or workstations, perform a boot process when the processing system is initially powered up for operation. During the boot process, the operating system used by the processing system is retrieved from a memory device, such as a disk drive or the like. One example of such an operating system is the well known "disk operation system" (DOS). Once the operating system has been retrieved, loaded, and is properly executing, the processing system can then be used for its intended purpose.

To initiate the boot process, power is applied to the processing system processor. That is, the boot process is initiated by turning on the processing system. The processor retrieves from a nonvolatile memory a Basic Input/Output System (BIOS) program. The nonvolatile memory wherein the BIOS resides is typically a limited capacity, solid-state memory that is directly coupled to, or that is part of, the processor. One example of a solid-state memory is the Read-Only Memory (ROM).

One of the initial functions of the BIOS program is to communicatively couple the processor with the various components of the processing system, including the memory device wherein the operating system resides, and to ensure that the processing system components are functioning correctly. The processor accomplishes this function by executing the Power On Self Test (POST) routines.

Another task of the BIOS is to specify the memory device where the operating system resides. The BIOS program causes the processor to search for, and then retrieve, a boot record from a resident memory that stores the native operating system. The boot record is typically stored at the first part of the memory, and may be referred to as a primary partition table in some systems. The boot record contains information identifying the various device addresses and related information required to operate the processing system. In some systems, this boot record is referred to as the Master Boot Record (MBR).

Within the boot record is a routine commonly referred to as the boot strap loader. Once the BIOS has caused the processor to retrieve the bootstrap loader from the memory, the BIOS passes control of the boot process to the bootstrap loader. One part of the bootstrap loader identifies the location of various addresses using a cylinders/heads/sectors (CHS) format. Accordingly, the memory device where the bootstrap loader and the operating system reside is configured to emulate a CHS type device addressing. Ultimately, the boot process concludes with the retrieval and installation of the processing system's operating system.

In some situations, the processor is unable to access the boot record and/or the native operating system. For example, the entire memory device, or a part of the memory device where the boot record and the native operating system reside, may have failed. In one instance, a part of the memory array may have failed. In another instance, a mechanical component may have failed, such as the drive motor on a disk storage device. In yet another instance, information in the boot record and/or the native operating system may be corrupted with erroneous information or data. When such situations occur, the processing system is unable to start up. That is, the boot process fails. Accordingly, the processing system cannot be used for its intended purpose because of the failed boot process.

When the boot process fails due to lack of a bootstrap loader, failure of partition data, or absence of an operating system, the BIOS will successively attempt to obtain the boot record and the operating system from another memory device. For example, the boot record and operating system may be stored on another hard disk, cd-rom, floppy disk, or network file share. When that device is present during the boot process (such as when the floppy disk is inserted into the processing system's floppy drive), the BIOS system retrieves the boot record and operating system stored on the device. Accordingly, the processing system is able to properly complete the boot process.

It is also known to use other types of memory media to store a boot record and operating system. One example is a solid-state memory device that is configured to communicatively couple to the processing system via a Universal Serial Bus (USB) port. When the solid-state memory device is coupled to the processing system during the boot process, the boot record and operating system are retrieved from the solid-state memory via the USB port. Since the bootstrap loader identifies the location of a various addresses using a cylinders/heads/sectors (CHS) format, the bootable solid-state memory device is configured to emulate a CHS type device addressing.

The boot record and operating system are loaded into the solid-state memory device when the solid-state memory device is initially formatted. During formatting, the solid-state memory device is coupled to the processing system via the USB port. However, because BIOS programs are different between various types of processing systems, and because the USB storage device geometry is unique, the initial mapping of the boot record and operating system into a particular BIOS based upon a CHS format is unique for each device model. That is, the boot record and operating system, after loading onto the bootable solid-state memory device, may be used to boot only those processing systems that have the same BIOS, or a compatible BIOS, as the BIOS of the processing system that initially loaded the boot record and operating system. Accordingly, the bootable solid-state memory device cannot be used to boot other types of processing systems.

SUMMARY

One embodiment of a bootable Universal Serial Bus (USB) memory system provides a method for booting a processing system using a bootable universal serial bus (USB) solid-state memory device, the method comprising; indicating to the processing system that the bootable USB solid-state memory device is active, communicating a boot record residing in a solid-state memory of the bootable USB solid-state memory device to the processing system during a boot process, communicating information to the processing system during the boot process that causes a reading of an operating system by the processing system during the boot process to occur using a logical block address (LBA) format, and communicating the operating system residing in the solid-state memory to the processing system during the boot process.

Another embodiment of a bootable Universal Serial Bus (USB) memory system provides a method for formatting a bootable universal serial bus (USB) solid-state memory device, the method comprising; writing a boot record into a solid-state memory of the bootable USB solid-state memory device using a first processing system, writing an operating system into the solid-state memory, and writing information into the boot record, thereby causing a subsequent reading of the operating system by a second processing system during a boot process to occur using a logical block address (LBA) format.

Another embodiment of a bootable USB memory device system comprising a USB connector configured to couple to a USB port of a processing system; a solid-state memory coupled to the USB connector; a boot record residing on the solid-state memory, and an operating system residing on the solid-state memory; wherein the boot record is configured to cause the processing system, when executing a Basic Input/Output System (BIOS) program during a boot process, to access the operating system using a logical block address (LBA) format.

Another embodiment of a bootable USB memory device system is a processing system comprising a universal serial bus (USB) port configured to couple to a bootable USB solid-state memory device, a format utility program configured to format a solid-state memory residing in the bootable USB solid-state memory device, a logical block address (LBA) utility program, and a processor configured to write a boot record and an operating system into the solid-state memory of the bootable USB solid-state memory device when the processor executes the format utility program, and configured to write information into the boot record such that when a second processing system loads the operating system during a boot process the operating system is accessed using an LBA format.

BRIEF DESCRIPTION OF THE DRAWINGS

The components in the drawings are not necessarily to scale relative to each other. Like reference numerals designate corresponding parts throughout the several views.

DETAILED DESCRIPTION

The bootable Universal Serial Bus (USB) memory device system 100 provides a system and method for booting differently configured processing systems having a different Basic Input/Output System (BIOS). During the formatting of a bootable USB memory device 102, the address pointer system is modified from a cylinders/heads/sectors (CHS) format to a logical block address (LBA) format. Since the LBA format is standardized and is not dependent upon the unique device geometry of the bootable USB memory device 102, or the unique BIOS system used to format the bootable USB memory device 102, other processing systems 104 having a USB port 106 may use the bootable USB memory device 102 for the boot process.

Figure 1:
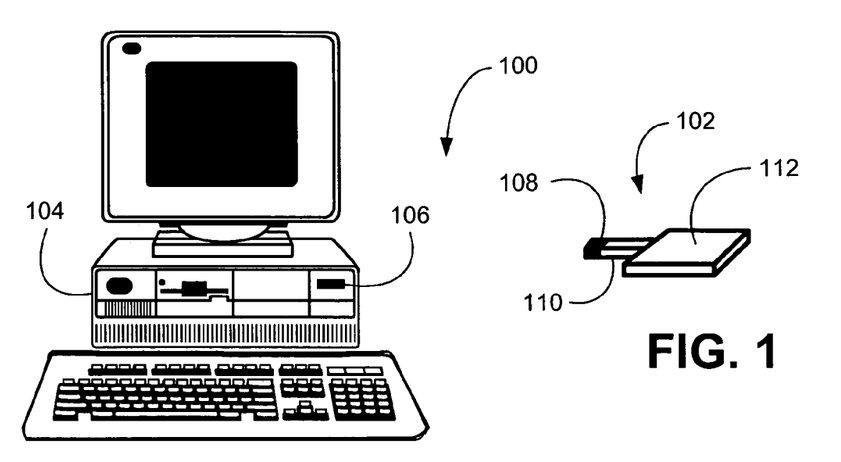
FIG. 1 is a block diagram illustrating an embodiment of a bootable Universal Serial Bus (USB) memory device system implemented in a USB memory device.

FIG. 1 is a block diagram illustrating an embodiment of a bootable USB memory device system 100 implemented in a bootable USB memory device 102. Processing system 104 includes a USB port 106. Accordingly, the bootable USB memory device 102 may be communicatively coupled to the USB port 106 by inserting a USB connector 108 into the USB port 106.

Figure 2:
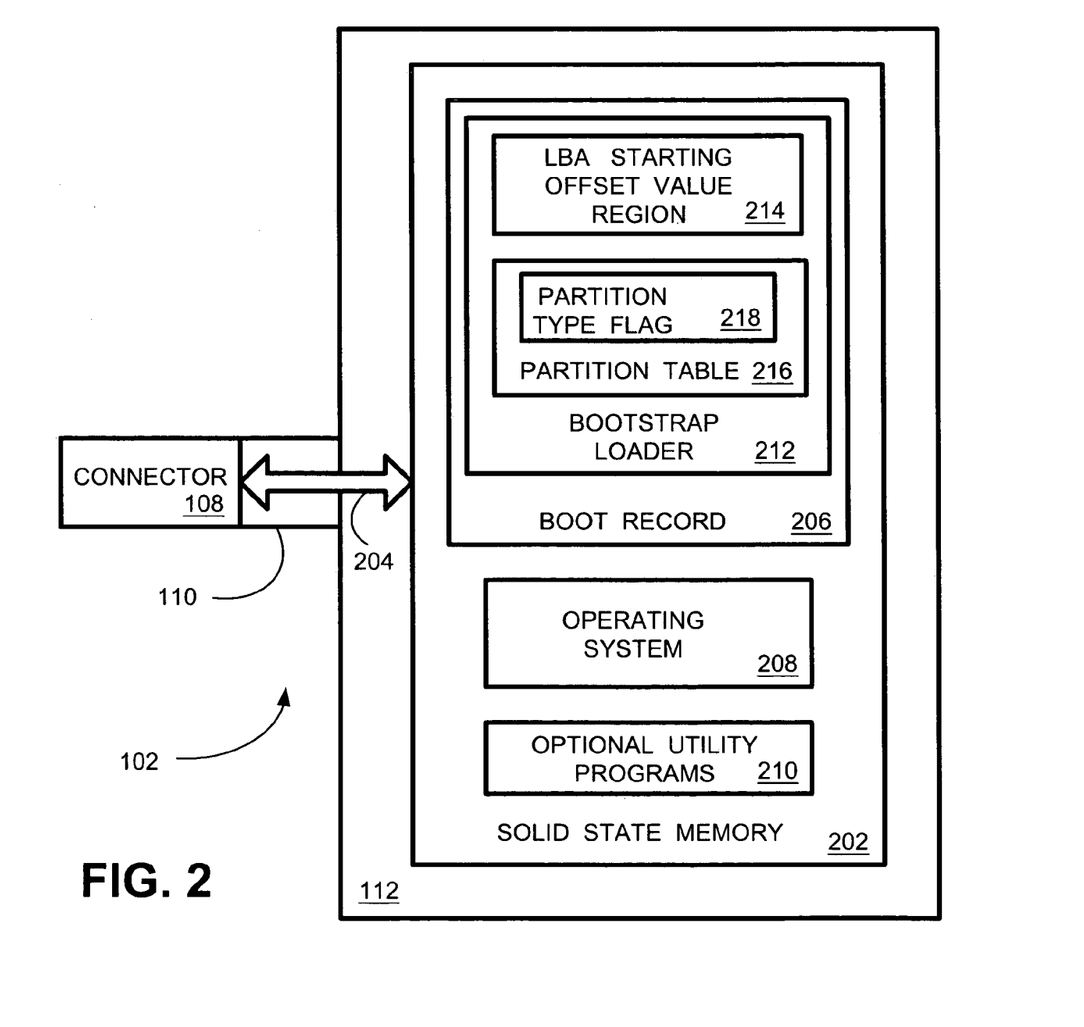
FIG. 2 is a block diagram illustrating an embodiment of a bootable USB memory device.

The bootable USB memory device 102 includes a solid-state memory 202 for storing a boot record 206 and an operating system 208 (FIG. 2). Thus, the bootable USB memory device 102 may also be referred to as a bootable USB solid-state memory device or a bootable solid-state memory device. Nonlimiting examples of solid-state memory 202 include flash memory, NAND-gate memory, a random access memory (RAM) or an erasable programmable read-only memory (EPROM or EEPROM).

Some embodiments of the bootable USB memory device 102 have the USB connector 108 on a protrusion 110 extending outward from the portion 112 where the solid-state memory 202 (FIG. 2) resides, thereby facilitating insertion of the USB connector 108 into the USB port 106 by a user. The bootable USB memory device 102 and the USB port 106 are not drawn to the same scale as the processing system 104, and these components may be relatively smaller than illustrated in FIG. 1. Since the bootable USB memory device 102 is illustrated using a simplified block diagram, embodiments of the bootable USB memory device 102 may have various designs based on other utilitarian factors and/or marketing considerations. Also, USB port 106 may reside in other locations, such as on the backside of the processing system 104.

FIG. 2 is a block diagram illustrating an embodiment of a bootable USB memory device 102. Bootable USB memory device 102 comprises the connector 108 and solid-state memory 202, communicatively coupled together via communication bus 204. Solid-state memory 202 comprises the boot record 206, the operating system 208 and one or more optional utility programs 210. The boot record 206 further comprises the bootstrap loader 212. In one embodiment, the bootstrap loader comprises the LBA starting offset value region 214 and the partition table 216, wherein the partition type flag 218 resides.

When the connector 108 is inserted into the USB port 106 of processing system 104 (FIG. 1), the solid-state memory 202 becomes communicatively coupled to processing system 104. Accordingly, during the boot process, processor 302 (FIG. 3 or 4) accesses the boot record 206 and operating system 208 so that the boot process can be completed. As described in greater detail hereinbelow, the bootstrap loader includes a partition type flag 218 that causes the processor 302 to operate in an LBA format. In one embodiment, an LBA starting offset value region 214 stores an offset value that is used to identify the starting address of the operating system 208.

Figure 3:
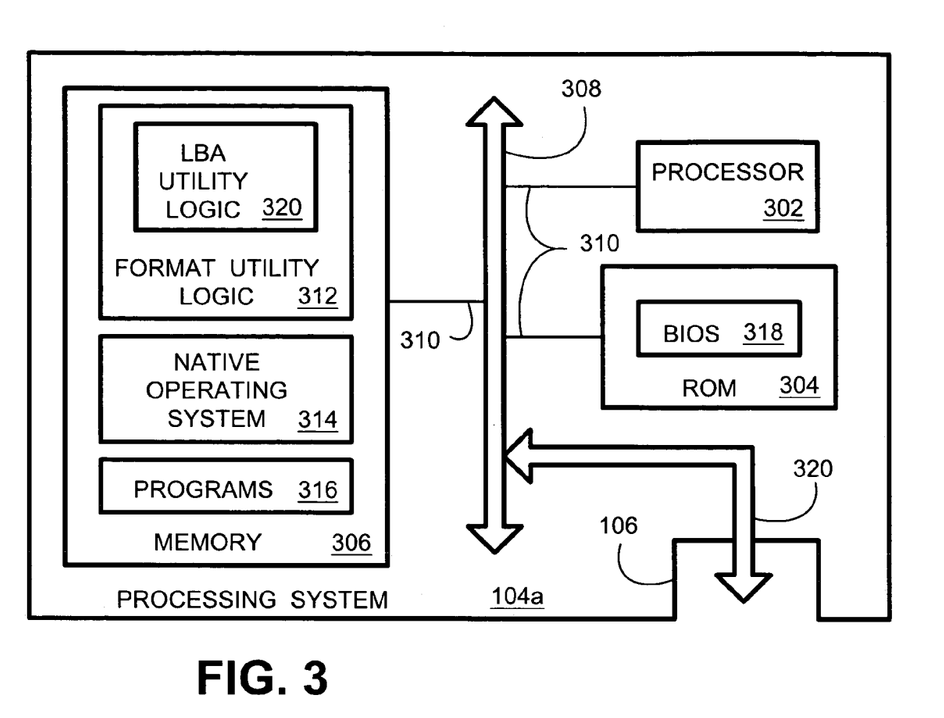
FIG. 3 is a block diagram illustrating an embodiment of a processing system used to format a bootable USB memory device.

FIG. 3 is a block diagram illustrating an embodiment of a processing system 104a used to format a bootable USB memory device 102 (FIGS. 1 and 2). Processing system 104a comprises processor 302, nonvolatile read-only memory (ROM) 304 and memory 306. For convenience, processor 302, read-only memory (ROM) 304 and memory 306 are illustrated as being communicatively coupled to communication bus 308 via connections 310. In alternative embodiments of processing system 104a, the above-described components are communicatively coupled to processor 302 in a different manner than illustrated in FIG. 3.

For example, but not limited to, ROM 304 may be directly coupled to processor 302 or may be coupled to processor 302 via intermediary components (not shown).

Memory 306 comprises format utility logic 312, native operating system 314 and one or more programs 316. During a normal boot process, processor 302 retrieves and executes the BIOS 318 residing in ROM 304. As part of the boot process, a bootstrap loader (not shown) residing in the native operating system 314 is executed such that the native operating system 314 is installed. Once the native operating system 314 is installed and operating, the processing system 104a can be used for its intended purpose. For example, one of the programs 316 may be retrieved and executed by processor 302.

Processing system 104a further comprises the USB port 106. A USB communication bus 320 is communicatively coupled to communication bus 308. When a USB-compatible device (not shown) is coupled into the USB port 106, either directly or through a suitable connector, the USB-compatible device may communicate with the processing system 104a.

The format utility logic 312 comprises format utilities for formatting memory devices, such as floppy disks, remote hard drives, USB-compatible solid-state memories, compact disks (CDs) or the like. The format utility logic 312 may also be referred to as a format utility program.

When a bootable USB memory device 102 is initially formatted, as described in greater detail hereinbelow, the LBA utility logic 320 is executed such that the newly formatted bootable USB memory device 102 is configured to boot a variety of different types of processing systems. Accordingly, the LBA utility logic 320 is an integral part of the format utility logic 312 in this exemplary embodiment. The format LBA utility logic 320 may also be referred to as an LBA utility program.

Figure 4:
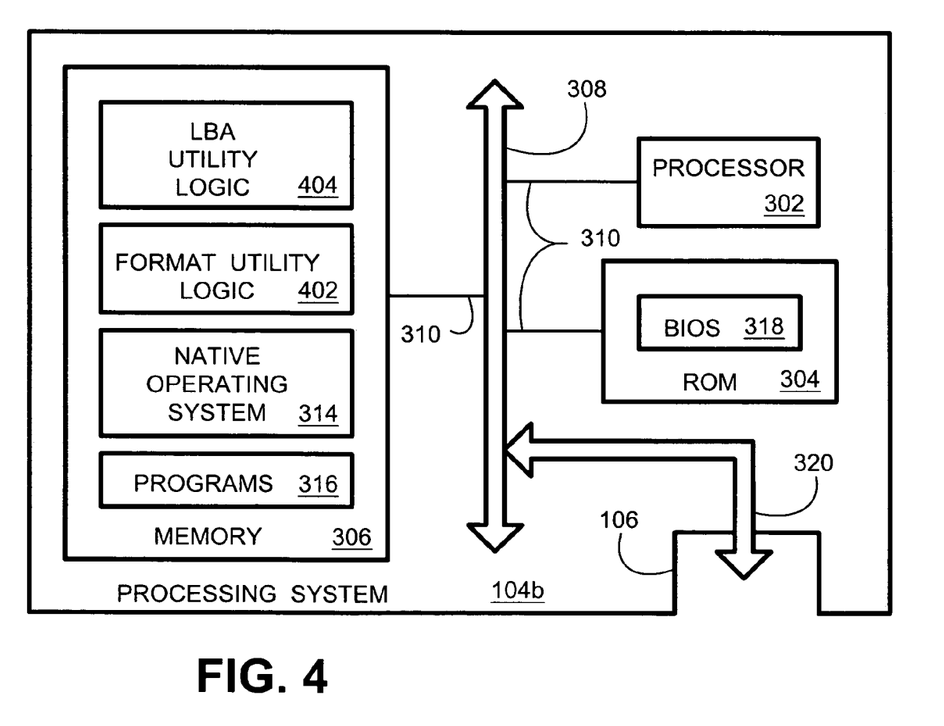
FIG. 4 is a block diagram illustrating another embodiment of a processing system used to format a bootable USB memory device.

FIG. 4 is a block diagram illustrating another embodiment of a processing system 104b used to format a bootable USB memory device 102 (FIGS. 1 and 2). Similar to processing system 104a (FIG. 3), processing system 104b also comprises processor 302, ROM 304 and memory 306. Memory 306 comprises native operating system 314, format utility logic 402, LBA utility logic 404 and one or more programs 316. For brevity, processing system 104b is not described again in detail since processing system 104b is similar to the various above-described embodiments of processing system 104a.

In this embodiment, the format utility logic 402 and the LBA utility logic 404 are separate. Accordingly, the LBA utility logic 404 can be separately installed, such as at a later, convenient time after the user has received the processing system 104b from the selling vendor.

Format utility logic 312 or 402 (FIG. 3 or 4, respectively) is configured to format memory devices that are communicatively coupled to the processing system 104a/b. When a bootable USB memory device 102 is initially coupled to the USB port 106 (when the processing system 104a/b is operating), the bootable USB memory device 102 has not yet been formatted.

Alternatively, the user may want to reformat the bootable USB memory device 102, or reformat another USB-compatible solid-state memory device into a bootable USB memory device 102. Accordingly, the processor 302 retrieves and executes the format utility logic 312 or 402.

With the above-described embodiment of processing systems 104a/b (FIG. 3 or 4), the LBA utility logic 320 or 404, respectively, is executed as part of the formatting process for a bootable USB memory device 102. Embodiments of the format utility logic 312 (having the LBA utility logic 320), or the LBA utility logic 404, are configured to cause the modification of information in the bootstrap loader 212 (FIG. 2). One modified piece of information is a flag or other suitable indicator that indicates that the processor 302 is to read information in the LBA format. Otherwise, the processor 302 reads information using the CHS format by default.

Other modified information in the bootstrap loader 212 includes information for determining one or more addresses in the solid-state memory 202 (FIG. 2) where the operating system 208 resides. Thus, the starting address of the operating system 208 is determinable by processor 302. In one embodiment, addresses are indicated using one or more offset values wherein processor 302 uses the specified offset value(s) residing in the LBA starting offset value region 214 (FIG. 2) to determine address locations. In another embodiment, addresses are specified directly in the LBA starting offset value region 214.

An illustrative example of one embodiment applicable to a disk operating system (DOS) is described hereinbelow. Principles demonstrated by this example are readily applicable to other embodiments. During the format process, the format utility logic 312 or 402 (FIG. 3 or 4) is executed to format the bootable USB memory device 102. As part of the formatting process, the bootstrap loader 212 and the operating system 208 are written to the solid-state memory 202 (FIG. 2). In this exemplary embodiment, the boot record 206 contains a partition table 216 of 446 bytes. Each data entry into the partition table 216 is 16 bytes in length. The format of the data entries are as follows:

Byte 1: "active" or "Bootable Flag (where a value of 128 denotes an active partition)
Bytes 2-4: Starting CHS addresses
Byte 5: Partition Type [examples include File Allocation Table (FAT) 16, FAT 32, New Technology File System (NTFS)]
Bytes 6-8: Ending CHS
Bytes 9-12 : Starting offsets in LBA
Bytes 13-16: Length of partition in blocks/sectors When the LBA utility logic 320 or 404 (FIG. 3 or 4) is executed, the offset 0xCA (hexadecimal) is changed to a value of 0xEB (corresponding to the LBA format). The offset 0xCB is changed to a value of 0x1A, and the offset 0xCC is changed to 0x90. By changing this information in the bootstrap loader 212, memory addressing during the boot process is in the LBA format rather than the default CHS format. Accordingly, a plurality of processing systems having a different BIOS may use the same bootable USB memory device 102 configured with these above-described modified information.

When the bootable USB memory device 102 is inserted into USB port 106 (FIG. 1), power is turned on for the processing system 104a/b (FIG. 3 or 4). The BIOS 318 (FIG. 3) iterates through the Power On Self Test (POST) routine and the various startup diagnostics. BIOS 318 determines what the device boot order is. Then, the first sector of the boot record on the identified boot device is read. When the bootable USB memory device 102 is present (coupled to the processing system 104a/b via the USB port 106), BIOS 318 determines that the bootable USB memory device 102 is the designated memory device that is to be read during the boot process.

After reading the first portion of the boot record 206, the BIOS 318 passes control to the boot strap loader 212. The bootstrap loader 212 locates and reads the four entries of the partition table 216 and determines that the partition is active, as indicated by a value of 128 in the first byte. The bootstrap loader 212 then retrieves the information from bytes 9-12 (rather than bytes 2-4 as in conventional systems using the CHS format) since the boot process is to use the LBA format, as described herein. Byte 5 changes the partition type to identify partitions as using the LBA format. For a FAT 16 system type, the value of byte 5 is changed from a value of 0x06 (hexadecimal) to a value of 0x0E. The offset for a FAT 32 system type, the value of byte 5 is changed from a value of 0x0B to a value of 0x0C. Accordingly, the bootstrap loader 212 may properly access the operating system 208 using the LBA format.

The bootstrap loader 212 reads and loads the operating system from the solid-state memory 202 of the bootable USB memory device 102. Once the operating system 208 is read and loaded, the boot process is completed.

In the above-described example, embodiments of the processing system 104a (FIG. 3) initially write the above-described information into the boot record 206 (FIG. 2) during the formatting process. That is, the boot record and the above-described information modifications are written concurrently during the formatting process. Alternatively, embodiments of the processing system 104b (FIG. 4) execute the LBA utility logic 404 to write or modify the above-described information into the boot record 206 after executing the format utility logic 402 (FIG. 4) to write the boot record 206 into the solid-state memory 202 (FIG. 2).

Figure 5:
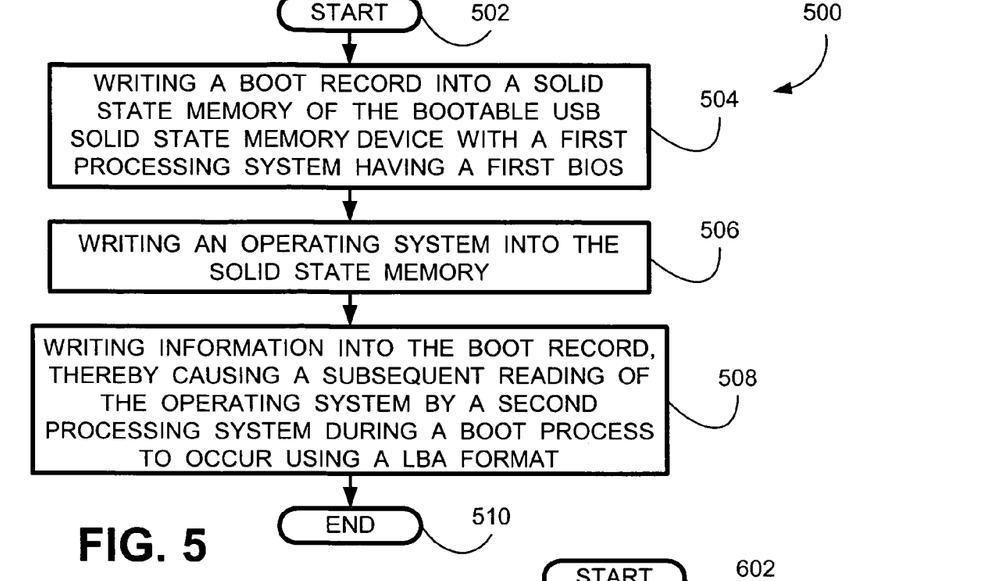
FIG. 5 shows a flow chart illustrating a process used by an embodiment of a processing system of FIGS. 3 and 4 that formats the bootable USB memory device.

FIG. 5 shows a flow chart illustrating a process used by an embodiment of a processing system 104a/b (FIGS. 3 and 4) that formats the bootable USB memory device 102 (FIGS. 3 and 4). The flow chart 500 of FIG. 5 shows the architecture, functionality and operation of an embodiment for implementing the format utility logic 312 (with the LBA utility logic 320) of FIG. 3, or the format utility logic 402 and the LBA utility logic 404 of FIG. 4, such that processing system 104a/b boots using the LBA format when a bootable USB memory device 102 is present during the boot process.

Figure 6:
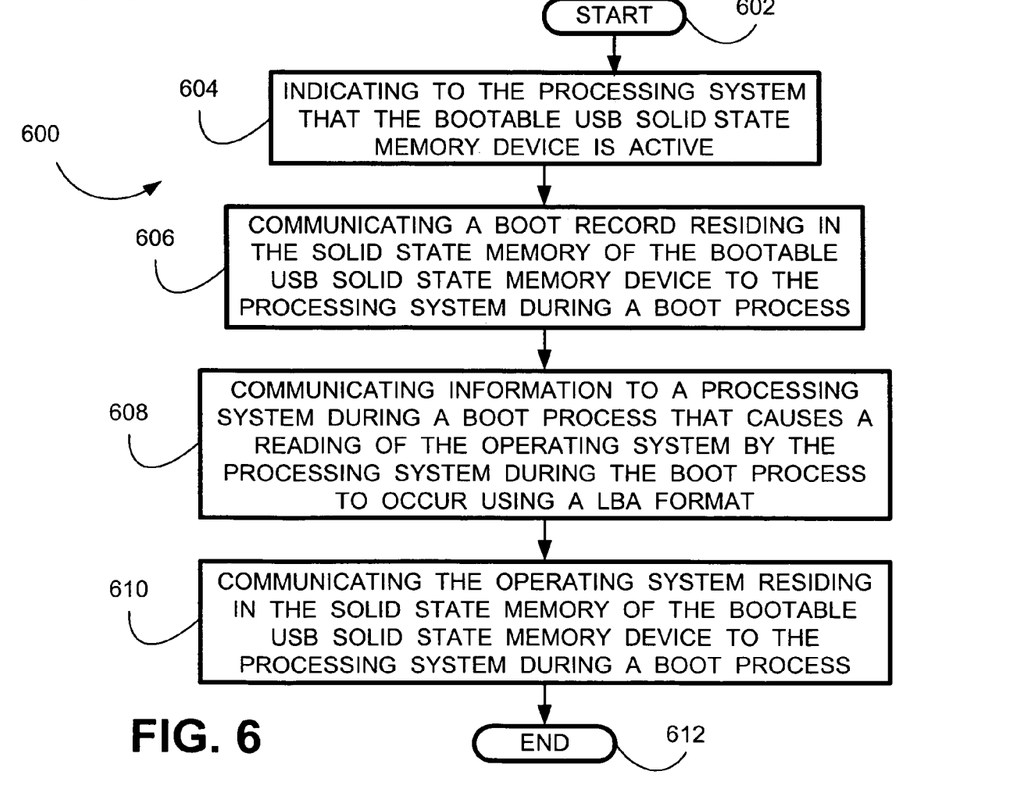
FIG. 6 shows a flow chart illustrating a process used by an embodiment of the bootable USB memory device of FIGS. 1 and 2.

FIG. 6 shows a flow chart 600 illustrating a process used by an embodiment of the bootable USB memory device 102 (FIGS. 1 and 2). The flow chart 600 of FIG. 6 shows the architecture, functionality, and operation of an embodiment for implementing the solid-state memory 202 (FIG. 2) such that a processing system 104a/b boots using the LBA format when the bootable USB memory device 102 is present during the boot process.

Alternative embodiments implement the logic of flow charts 500 or 600 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIGS. 5 and 6, or may include additional functions. For example, two blocks shown in succession in FIG. 5 or 6 may in fact be substantially executed concurrently, the blocks may sometimes be executed in the reverse order, or some of the blocks may not be executed in all instances, depending upon the functionality involved, as further clarified herein.

The process used by an embodiment of a processing system 104a/b (FIGS. 3 and 4) that formats the bootable USB memory device 102 (FIGS. 3 and 4) begins at block 502. At block 504, a boot record is written into a solid-state memory of the bootable USB solid-state memory device using a first processing system. At block 506, an operating system is written into the solid-state memory. At block 508, information is written into the boot record, thereby causing subsequent reading of the operating system by a second processing system during a boot process to occur using a logical block address (LBA) format. The process ends at block 510.

The process used by an embodiment of the bootable USB memory device 102 (FIGS. 1 and 2) begins at block 602. At block 604, the bootable USB memory device 102 indicates to the processing system that the bootable USB solid-state memory device is active. At block 606, a boot record residing in the solid-state memory of the bootable USB solid-state memory device is communicated to the processing system during a boot process. At block 608, information is communicated to the processing system during the boot process that causes a reading of an operating system by the processing system during the boot process to occur using a logical block address (LBA) format. At block 610, the operating system residing in the solid-state memory is communicated to the processing system during the boot process. The process ends at block 612.

Embodiments of the invention implemented in memory 306 (FIG. 3 or 4) may be implemented using any suitable computer-readable medium. Embodiments of the invention implemented in memory 202 (FIG. 2) may be implemented using any suitable solid-state, computer-readable medium. In the context of this specification, a "computer-readable medium" can be any means that can store, communicate, propagate, or transport the data associated with, used by or in connection with the instruction execution system, apparatus, and/or device. These computer-readable media can be, for example, but not limited to, an electronic, magnetic, optical, electromagnetic, infrared, or semiconductor system, apparatus, device, or propagation medium now known or later developed.

It should be emphasized that the above-described embodiments are merely examples of the disclosed system and method. Many variations and modifications may be made to the above-described embodiments. All such modifications and variations are intended to be included herein within the scope of this disclosure and protected by the following claims.

Therefore, having thus described the invention, at least the following is claimed:

1. A bootable solid-state memory device comprising:
 a universal serial bus (USB) connector configured to couple to a USB port of a processing system;
 a solid-state memory coupled to the USB connector;
 a boot record residing on the solid-state memory; and
 an operating system residing on the solid-state memory,
 wherein the boot record comprises an indicator that indicates to a processor of the processing system that the processor is to access the operating system using a logical block address (LBA) format when executing a Basic Input/Output System (BIOS) program during a boot process prior to another operating system being run by the processing system.

2. The bootable solid-state memory device of claim 1, wherein the indicator comprises a partition-type flag that changes access to the operating system from a default cylinders/heads/sectors (CHS) format to the LBA format.

3. The bootable solid-state memory device of claim 2, wherein the data described comprises:
 a value of 0xEB at offset 0xCA;
 a value of 0x1A at offset 0xCB; and
 a value of 0x90 at offset 0xCC.

4. The bootable solid-state memory device of claim 1, wherein the boot record comprises a value of a byte 5 equal to 0x0E, the byte 5 corresponding to a file allocation table (FAT) 16 system type.

5. The bootable solid-state memory device of claim 1, wherein the boot record comprises a value of a byte 5 equal to 0x0C, the byte 5 corresponding to a file allocation table (FAT) 32 system type.

6. A processing system comprising:
a universal serial bus (USB) port configured to couple to a bootable USB solid-state memory device;
a format utility program configured to format a solid-state memory residing in the bootable USB solid-state memory device;
a logical block address (LBA) utility program; and
a processor configured to write a boot record and an operating system into the solid-state memory of the bootable USB solid-state memory device when the processor executes the format utility program, and configured to write an indicator into the boot record that indicates to a second processor that the second processor is to access the operating system using a logical block address (LBA) format when the second processor loads the operating system during a boot process prior to another operating system being run by the second processor such that the operating system is accessed using a LBA format.

7. The processing system of claim 6, wherein the processing system comprises a first Basic Input/Output System (BIOS) program and the second processor executes a second BIOS program, the second BIOS program being different from the first BIOS program.

8. The processing system of claim 6, wherein the LBA utility program is an integral component of the format utility program such that the LBA utility program is executed concurrently with the format utility program.

9. The processing system of claim 6, wherein the LBA utility program is separate from the format utility program such that the LBA utility program is executed at a later time after the format utility program has formatted the USB solid-state memory device.

10. A method for formatting a bootable universal serial bus (USB) solid-state memory device, the method comprising:
writing a boot record into a solid-state memory of the bootable USB solid-state memory device using a first processing system;
writing an operating system into the solid-state memory; and
writing an indicator into the boot record that indicates to a processor that the processor is to access the operating system using a logical block address (LBA) format, thereby causing a subsequent reading of the operating system by the processor during a boot process to occur using LBA format prior to another operating system being run by the processor.

11. The method of claim 10, further comprising formatting the solid-state memory using the first processing system, wherein the first processing system comprises a first Basic Input/Output System (BIOS) program and the second processor executes a second BIOS program, the second BIOS program being different from the first BIOS program.

12. The method of claim 10, wherein writing an indicator comprises writing an indicator corresponding to a partition-type flag to change the subsequent reading of the operating system from a cylinders/heads/sectors (CHS) format to the LBA format.

13. The method of claim 12, wherein writing information corresponding to the partition type flag comprises:
writing a value of 0xEB at offset 0xCA;
writing a value of 0x1A at offset 0x0B; and
writing a value of 0x90 at offset 0xCC.

14. The method of claim 10, further comprising modifying a value of a byte 5 in the boot record for a file allocation table (FAT) 16 system type from 0x06 to 0x0E.

15. The method of claim 10, further comprising modifying a value of a byte 5 in the boot record for a file allocation table (FAT) 32 system type from 0x0B to 0x0C.

16. The method of claim 10, further comprising writing information corresponding to at least one starting offset such that the processor during the subsequent reading of the operating system determines at least one corresponding address of the operating system using the LBA format.

17. The method of claim 10, wherein writing an indicator in the boot record is performed after writing the boot record into the solid-state memory is completed.

18. The method of claim 10, wherein writing an indicator in the boot record is performed concurrently with writing the boot record into the solid-state memory.

19. A method for booting a processing system using a bootable universal serial bus (USB) solid-state memory device, comprising:
indicating to the processing system that the bootable USB solid-state memory device is active;
communicating a boot record residing in a solid-state memory of the bootable USB solid-state memory device to the processing system during a boot process;
communicating an indicator to the processing system during the boot process that indicates to the processing system that the processing system is to access an operating system resident on the USB solid-state memory device using a logical block address (LBA) format so as to cause a reading of an operating system by the processing system during the boot process to occur using LBA format prior to another operating system being run by the processing system; and
communicating the operating system residing in the solid-state memory to the processing system during the boot process.

20. The method of claim 19, wherein communicating an indicator comprises communicating a first data value of offset 0xCA at a value of 0xEB, communicating a second data value of offset 0xCB at a value of 0x1A, and communicating a third data value of offset 0xCC at a value of 0x90.

21. The method of claim 19, further comprising communicating a value of a byte 5 for a file allocation table (FAT) 16 system type equal to 0x0E.

22. The method of claim 19, further comprising communicating a value of a byte 5 for a file allocation table (FAT) 32 system type equal to 0x0C.

23. A computer-readable memory residing in a first processing system and having a program for formatting a bootable universal serial bus (USB) solid-state memory device, the program comprising logic configured to:
format a solid-state memory in the USB solid-state memory device;
write a boot record into the solid-state memory of the bootable USB solid-state memory device;
write an operating system into the solid-state memory; and
write an indicator into the boot record that indicates to a processor that the processor is to access the operating system using a logical block address (LBA) format, thereby causing a subsequent reading of the operating system by the processor during a boot process to occur using LBA format prior to another operating system being run by the processor.

24. The computer-readable memory of claim 23, wherein the logic configured to write an indicator is configured to write information corresponding to a partition-type flag into the solid-state memory, the partition type flag changing the subsequent reading of the operating system from a cylinders/heads/sectors (OHS) format to the LBA format.

25. The computer-readable memory of claim 24, wherein the logic configured to write information corresponding to the partition-type flag comprises logic configured to:
write a value of 0xEB at offset 0xCA;
write a value of 0x1A at offset 0xCB; and
write a value of 0x90 at offset 0xCC.

26. The computer-readable memory of claim 23, further comprising logic configured to modify a value of a byte 5 for a file allocation table (FAT) 16 system type from 0x06 to 0x0E.

27. The computer-readable memory of claim 23, further comprising logic configured to modify a value of a byte 5 for a file allocation table (FAT) 32 system type from 0x0B to 0x0C.

28. The computer-readable memory of claim 23, wherein the logic configured to write is configured to execute after the logic that writes the boot record into the solid-state memory.

29. The computer-readable memory of claim 23, wherein the logic configured to write is configured to execute concurrently with the logic that writes the boot record into the solid-state memory.

30. A computer-readable memory residing in a bootable universal serial bus (USB) solid-state memory device and having a program for booting a processor system, the program comprising logic configured to:

communicate a boot record residing in a solid-state memory of the bootable USB solid-state memory device to a processor during a boot process;
communicate an operating system residing in the solid-state memory to the processor during the boot process; and
communicate an indicator to the processor during the boot process that indicates to the processor that the processor is to access the operating system using a logical block address (LBA) format so as to cause a reading of the operating system by a processing system during the boot process to occur using LBA format prior to another operating system being run by the processing system.

31. The computer-readable memory of claim 30, wherein the logic configured to communicate comprises logic configured to communicate a first data value at offset 0xCA a value of 0xEB, communicates a second data value at offset 0xCB a value of 0x1A, and communicates a third data value at offset 0xCC a value of 0x90.

32. The computer-readable memory of claim 30, further comprising logic configured to communicate a value of a byte 5 for a file allocation table (FAT) 16 system type equal to 0x0E.

33. The computer-readable memory of claim 30, further comprising logic configured to communicate a value of a byte 5 for a file allocation table (FAT) 32 system type equal to 0x0C.

* * * * *

UNITED STATES PATENT AND TRADEMARK OFFICE
CERTIFICATE OF CORRECTION

| | | |
|---|---|---|
| PATENT NO. | : 7,293,166 B2 | Page 1 of 1 |
| APPLICATION NO. | : 10/794213 | |
| DATED | : November 6, 2007 | |
| INVENTOR(S) | : Tri M. Nguyen et al. | |

It is certified that error appears in the above-identified patent and that said Letters Patent is hereby corrected as shown below:

Column 9, line 66, in Claim 13, delete "0×0B;" and insert -- 0×CB; --, therefor.

Column 11, line 4, in Claim 24, delete "(OHS)" and insert -- (CHS) --, therefor.

Signed and Sealed this

Twentieth Day of May, 2008

JON W. DUDAS
*Director of the United States Patent and Trademark Office*